United States Patent [19]

Obara et al.

[11] Patent Number: 4,922,426
[45] Date of Patent: May 1, 1990

[54] CONTROL SYSTEM FOR VEHICLE EQUIPMENT

[75] Inventors: Hideo Obara, Tokyo; Takayuki Yanagishima, Yokosuka, both of Japan

[73] Assignee: Nissan Motor Co., Ltd., Tokyohama, Japan

[21] Appl. No.: 187,198

[22] Filed: Apr. 28, 1988

[30] Foreign Application Priority Data

May 22, 1987 [JP] Japan ............................ 62-76138[U]

[51] Int. Cl.⁵ ............................................ G06F 15/20
[52] U.S. Cl. ................................ 364/424.05; 318/467; 296/65.1
[58] Field of Search .................... 364/424.05; 318/466, 318/467, 468, 568; 307/10 R; 296/65.1

[56] References Cited

U.S. PATENT DOCUMENTS

| | | | |
|---|---|---|---|
| 4,503,504 | 3/1985 | Suzumura et al. | 364/424.05 |
| 4,661,752 | 4/1987 | Nishikawa et al. | 364/424.05 |
| 4,707,788 | 11/1987 | Tashiro et al. | 318/466 |
| 4,775,939 | 10/1988 | Nakashima et al. | 364/424.05 |

FOREIGN PATENT DOCUMENTS 58-33569 2/1983 Japan.
58-33570 2/1983 Japan.
58-33571 2/1983 Japan.

*Primary Examiner*—Gary Chin
*Attorney, Agent, or Firm*—Pennie & Edmonds

[57] ABSTRACT

In order to provide a seat control which can automatically move a drivers seat and ancillary equipment (e.g. steering wheel) from a set of preselected driving positions to a retracted status in the least disconcerting manner, one of operations (e.g. the steering column tilting operation) is used as a standard for terminating the movement of all of the other movements toward given retracted positions upon the selected operation finishing. Even though the movement of the seat toward its most rearward position may not have been fully completed, the upward tilting of the steering column (viz., the movement incurred with the selected operation) in combination with what rearward movement of the seat has been possible during the tilting, opens up a space sufficient for the driver to easily ingress and egress and positively ensures that all of the various movements terminate simultaneously.

15 Claims, 7 Drawing Sheets

CONTROL SYSTEM FOR VEHICLE EQUIPMENT

BACKGROUND OF THE INVENTION

1. Field of the Invention

The present invention relates to a control system for controlling the position of vehicle equipment such as the seats and steering column or the like of an automotive vehicle and more specifically to a system which provides improved termination timing with which seats and other controls are moved from a preselected set of "driving" positions to retracted ones which permit ready ingress and egress.

2. Description of the Prior Art

It has been previously proposed to provide the drivers seat and the steering column with servo motors and a memory arrangement which permit (a) the seat and the steering column to be automatically retracted to positions which enable easy ingress and egress and (b) to be returned to preselected memorized positions once the driver has entered the vehicle and become seated in the drivers seat.

Examples of such prior art can be found in JP-A-58-33569, 58-33570 and 58-33571.

These type of arrangements, in order to provide the maximum possible amount of space for the driver to maneuver during ingress and egress, provide for the steering column to be tilted upward to the maximum permissible angle and induce a telescoping or extension control servo to reduce the length of the column to its minimum possible length. Simultaneously, the drivers seat is moved to its most rearward position.

Upon re-entering the vehicle the control system is suitably triggered to return at least the steering column length and angle, and seat position to predetermined "driving" positions.

However, the problem occurs that the completion of the steering column tilting and telescoping to their respective "retracted" positions and the seat sliding to its rear most position almost invariably occur at different timings. This tends to be disconcerting to the driver who is unable to ascertain just when all of the adjustment will terminate and therefore when to egress from the vehicle.

For example, as shown in FIG. 7 in order to facilitate ingress and egress from the vehicle, the steering column is tilted to its maximum possible angle while the length thereof is reduced to its minimum possible degree of extension. Simultanouesly the seat is moved rearwardly from the selected driving position.

In order to have the timing with which the steering wheel and the drivers seat arrive at their respective fully retracted positions, be as close as possible, it is possible to set point B as a standard and arrange for the gear ratios and the speeds of the servo motors which move the steering column and the seat such that, if the retraction operation begins with the steering wheel located a point B, and the seat located at a predetermined setting, then the wheel will arrive at point C at the same time as the seat reaches its most rearward position. However, the merit of this arrangement is very limited in that the length of the arms and the legs of individuals vary considerably as do the preferred driving positions. Viz., some drivers prefer a straight arm position while others like to sit very close to the wheel, some drivers like to extend their legs out straight while others prefer to bend the same and so on. Accordingly, it often happens that when the driving position is such that the center of the wheel is located at a point D which is distal from the standard point B and the seat is not set at the predetermined position. As a result, the termination of the seat movement and the steering column movement invariably stop at different timings and thus has not proven an effective measure against the disconcerting effect of the different termination timings.

SUMMARY OF THE INVENTION

It is an object of the present invention to provide a seat control which can automatically move a drivers seat and ancillary equipment (e.g. steering wheel) from a set of preselected driving positions to a fully retracted position in the least disconcerting manner.

In brief, this object is carried out by selecting one of the operations (e.g. the steering column tilting operation) as a standard and terminating the movement of all of the other movements toward given retracted positions upon this selected operation finishing. With this even though the movement of the seat toward its most rearward position may not have been fully completed, the upward tilting of the steering column (viz., the movement incurred with the selected operation) in combination with what rearward movement of the seat has been possible during the tilting, opens up a space sufficient for the driver to easily ingress and egress and positively ensures that all of the various movements terminate simultaneously.

More specifically, a first aspect of the present invention comes in the form of a method of controlling vehicle equipment, the method featuring the steps of: memorizing a first predetermined seat position wherein ingress and egress from said vehicle is facilitated; memorizing a first desired seat position suited to driving in said vehicle; memorizing a second predetermined position for a piece of vehicle equipment; memorizing a second desired driving position for said piece of equipment; moving said piece of equipment from the second desired driving position toward said second predetermined position in response to a first signal; moving said seat from said first desired position toward said first predetermined position; and terminating the movement of said seat toward said first predetermined position in response to the piece of equipment reaching said second predetermined position.

A second aspect of the invention comes in the form of vehicle equipment control sytstem which features: means for memorizing a first predetermined seat position wherein ingress and egress from said vehicle is facilitated; means for memorizing a first desired seat position suited to driving in said vehicle; means for memorizing a second predetermined position for a piece of vehicle equipment; means for memorizing a second desired driving position for said piece of equipment; means for moving said piece of equipment from the second desired driving position toward said second predetermined position in response to a first signal; means for moving said seat from said first desired position toward said first predetermined position; and means for terminating the movement of said seat toward said first predetermined position in response to the piece of equipment reaching said second predetermined position.

A third aspect of the present invention comes in the form of a vehicle which includes a seat; a first servo for selectively moving the seat between a first predetermined position wherein ingress and egress from said vehicle is facilitated and a first selectable desired driving position; a steering wheel, said steering wheel being mounted on a steering column; a second servo for moving said steering column between a second predetermined position wherein ingress and egress from the vehicle is faciliated and a second selectable desired driving position; a circuit including a memory, said memory being arranged to be conditioned to retain said first and second predetermined positions and said first and second selectable desired driving positions, said circuit being operatively connected with said first and second servos, said circuit being arranged to induce said first servo to move said seat toward said first predetermined position from the first selected one and said second servo to move said steering column to said second predetermined position, said circuit being further arranged to terminate the operation of said first and second servos upon said steering column reaching said second predetermined position.

A further aspect of the present invention comes in the form of a method of controlling vehicle equipment comprising the steps of: using a first servo to selectively move a seat between a first predetermined position wherein ingress and egress from said vehicle is facilitated and a first selectable desired driving position; using a second servo to move a steering column on which a steering wheel is mounted between a second predetermined position wherein ingress and egress from the vehicle is faciliated and a second selectable desired driving position; using a circuit including a memory; retaining said first and second predetermined positions and said first and second selectable desired driving positions in said memory; conditioning circuit to, in response to a first signal, induce said first servo to move said seat toward said first predetermined position from the first selected one and said second servo to move said steering column to said second predetermined position; and terminating the operation of said first and second servos upon said steering column reaching said second predetermined position.

DESCRIPTION OF THE PREFERRED EMBODIMENTS

Figure 1:
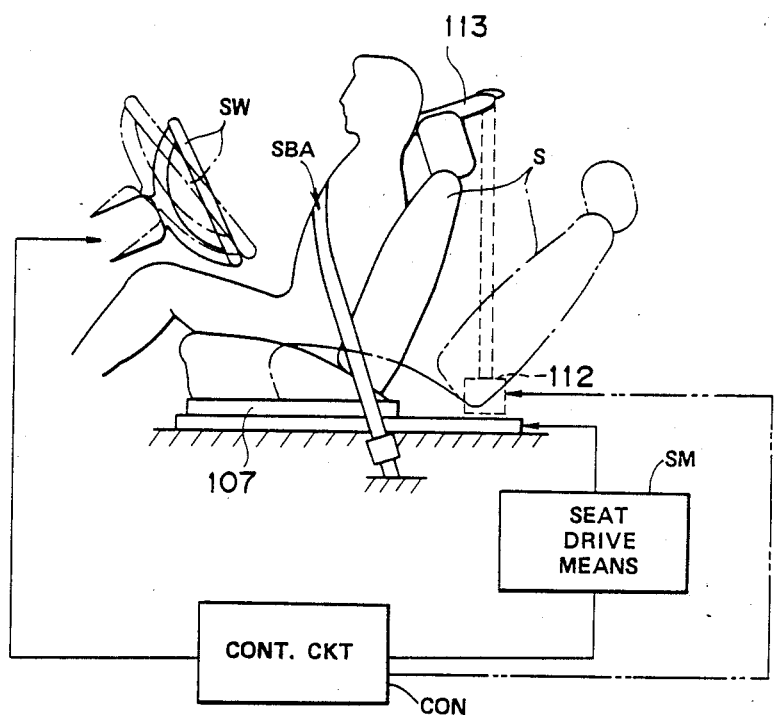
FIG. 1 shows schematically the system to which the instant invention is applied.

FIG. 1 shows schematically the arrangement to which the present invention is applied. As shown, a control circuit CON is arranged to selectively control the movement of seat in the fore and aft directions by applying a suitable control input to the seat drive means SM. This device is operatively connected to the seat in a manner which enables the movement of the same along rails or the like secured to the floor of the vehicle.

The control circuit CON is also connected to a steering wheel arrangement SW in a manner which permits the angle (tilting) and the amount of telescoping or extension thereof to be controlled.

Although not essential to the instant invention the control circuit CON can be further connected to a seat belt retractor mechanism 112 in manner to control the amount of seat belt 113 which is wound out or wound in, in accordance with the movement and/or position of the vehicle seat. In this figure the seat belt, retractor, buckle, buckle switch and the like are generally denoted by SBA.

Figure 2:
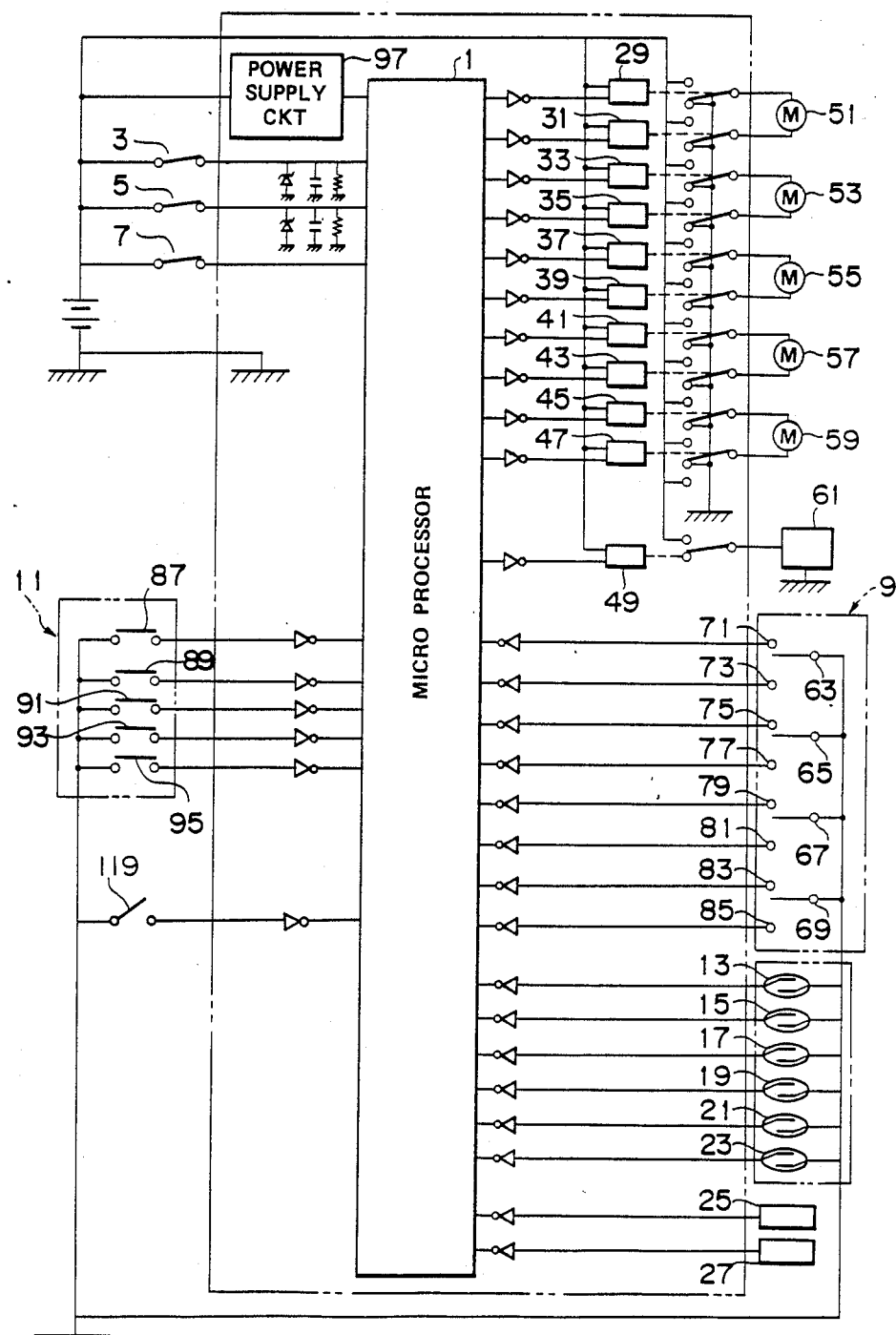
FIG. 2 is a schematic circuit diagram showing switches, relays and a microprocessor operatively interconnected in a manner which facilitates the operation and control of the arrangement shown in FIG. 1.

FIG. 2 shows details of the hardware used in connection with the first embodiment of the instant invention. In this arrangement the control circuit includes a mircroprocessor 1 which although not specifically illustrated, includes a RAM, ROM, CPU and input and output interfaces. These elements are all formed on a single LSI type chip. In this instance the ROM includes programs which selectively sample input data and derive suitable control commands in accordance therewith.

The input interface of the microprocessor 1 is operatively connected to an engine ignition switch 3, door switch 5, a buckle switch 7, a manually operable position adjustment switch unit 9 and a manually operable position/orientation control switch unit 11.

The input interface is further connected with a steering wheel tilt degree sensor 13, an extension (telescoping) sensor 15 which indicates the degree by which the telecopic steering column is elongated, a seat slide or position sensor 17, and a seat lift or height sensor 19. In addition to these the illustrated system further includes a primary seat belt slack adjustment (wind in or retraction amount) sensor 21, a secondary seat belt slack adjustment (wind out or elongation amount) sensor 23, a vehicle speed sensor 25 which produces a pulse train the frequency of which is indicative of vehicle speed, and acceleration sensor 27 which is arranged to be responsive to low vehicle accelerations.

It will be noted at this point that if the seat belt control is not incorporated into the system then sensors 21 to 27 can be omitted with the possible exception of the vehicle speed sensor 25.

The output interface of the microprocessor is connected to relays 29, 31, 33, 35, 37, 39, 41, 43, 45, 47 and 49. As shown, relays 29, 31 are connected with a steering column tilt motor 51; relays 33, 35 are connected with steering column extension (telescoping) servo motor 53; relays 37, 39 are connected with a seat slide servo motor 55, relays 41, 43 are connected with a seat lift or height control motor 57; relays 45, 47 are connected with seat belt retractor motor 59; and relay 49 is connected with a solenoid 61 which forms part of a so called tensionless control arrangement in the seat belt retractor.

Figure 4:
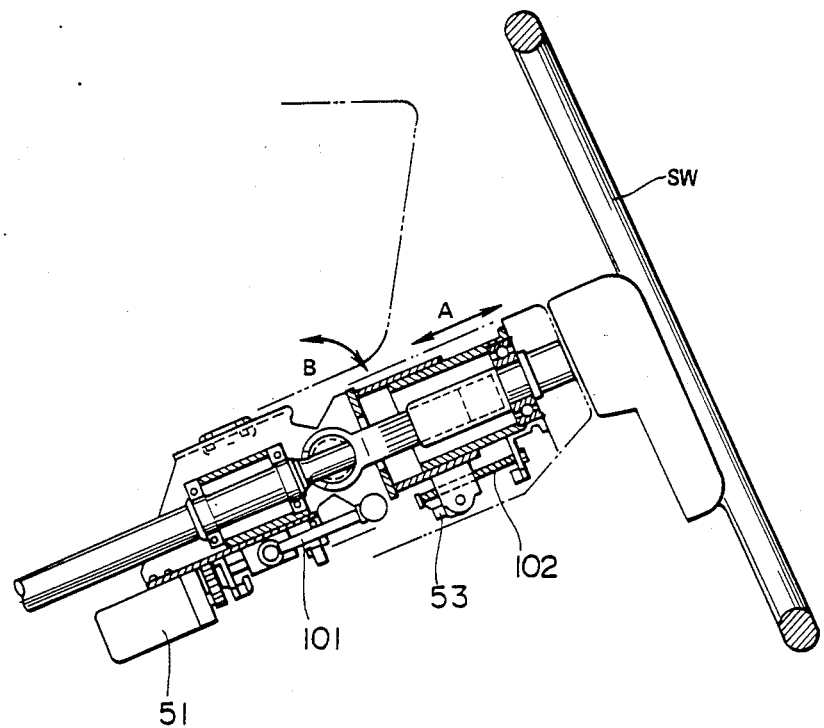
FIG. 4 is a side sectional elevation of a steering column which is provided with tilting and telescoping servo motors of the nature used in the arrangement shown in FIG. 1.

As shown in FIG. 4, when the motor 51 which controls the degree of extension of the telescopic steering column, is energized a shaft 101 which is operatively connected therewith induces the steering column to tilt about a suitable universal joint (no numeral) in a manner shown in arrow B. On the other hand, when elongation or telescoping control motor 53 is energized the length of the steering column is varied in the manner illustrated by arrow A.

Figure 5:
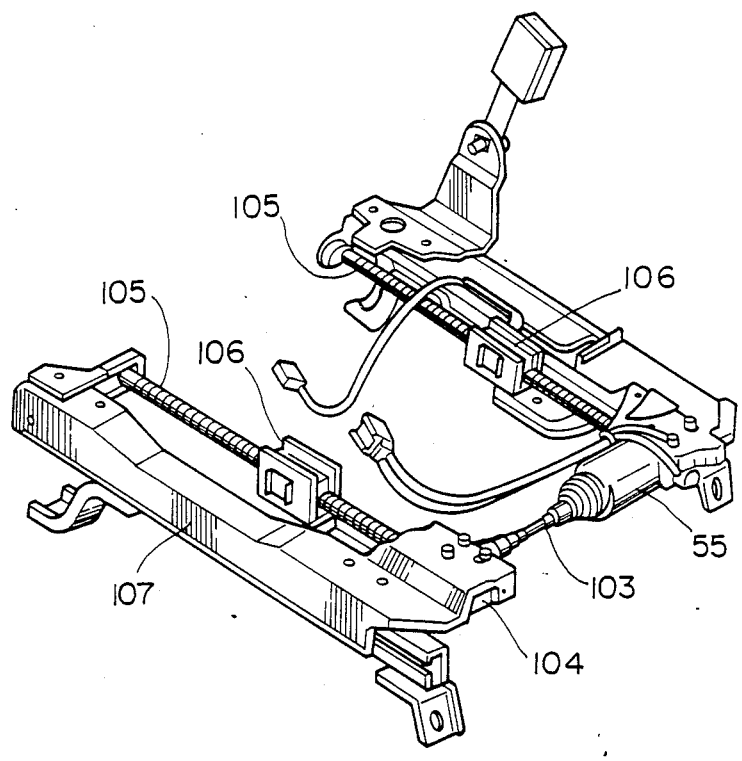
FIG. 5 is a perspective view of a seat slide arrangement illustrating the servo motor arrangement which permits the seat to be selectively moved forward and aft within the vehicle.
Figure 6:
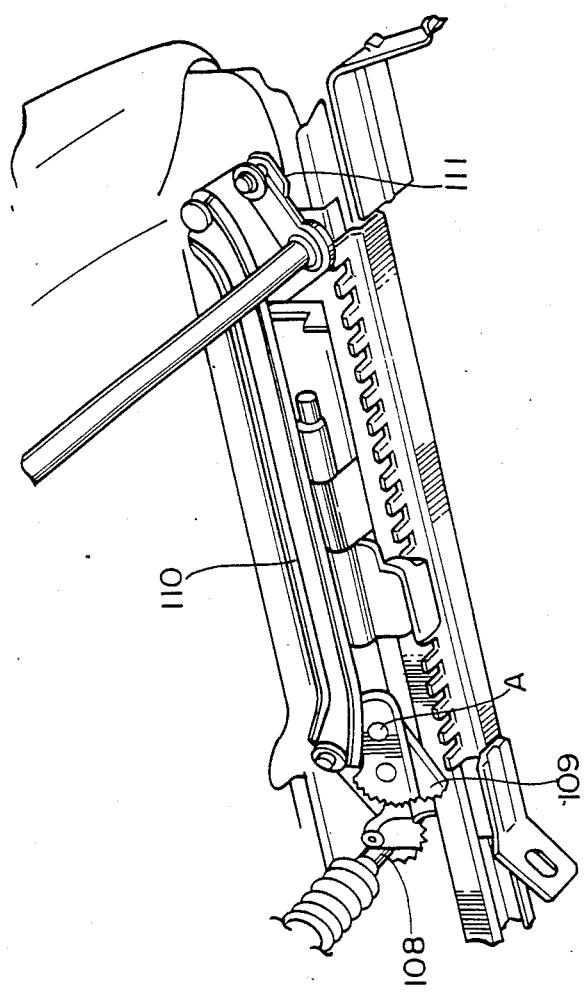
FIG. 6 is a perspective view showing the underside of the vehicle seat and some of the apparatus which facilitates the selective height adjustment of the seat.
Figure 7:
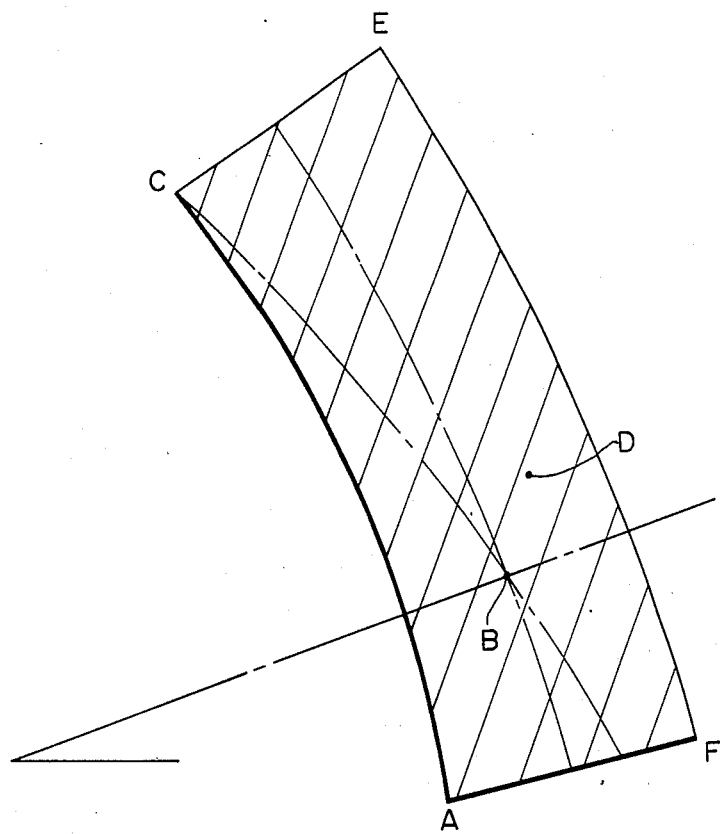
FIG. 7 is a diagram showing the zone in which the steering wheel is movable (tiltable and retractable).

FIGS. 5 and 6 show details of the construction which enable the seat to be selectively moved along support rails 107 and to be adjusted in height. In this arrangement when the seat slide motor 55 (as it will be referred to hereinafter) is energized, the output of the motor is transmitted by a flexible wire cable 103 and worm gear 104 arrangement to lead screws 105. Screw nuts 106 are mounted on the lead screws 105 and connected to slide outers 107 in a manner wherein, when the motor 55 is energized the seat proper which is mounted on the slide outers 107 is selectively moved either forward or backwards depending on the rotational direction in which the motor 55 is being energized. Of course as will be appreciated, the rotational direction of the motor is controlled by selectively controlling the passage of current through relays 37 and 39.

The seat lift or height control arrangement is such that when motor 57 (see FIG. 2) is energized the output of the same is transmitted to side gear 108 (see FIG. 6) The rotation of gear 108 is transmitted to a sector gear 109 which meshes with the former element and which is aranged to be pivotal about an axis A. The movement of the side gear 108 is transmitted to a rear link 111 by way of connection link 110 and induces the seat to rise and fall in accordance with the positioning of the side gear. For further details concerning the construction and arrangement of this device reference may be made to NISSAN SERVICE MANUAL 517 D - 36). The numeral 29 deontes a seat belt retractor motor which is operatively connected with the mircroprocessor by relays 45 and 47. However, if desired this motor can be omitted for reasons set forth hereinbefore or can be used for different purposes such as seat back tilting by way of example.

The manual adjustment switch unit 9 includes movable contacts 63, 65, 67 and 69 and corresponding stationary contacts 71, 73, 75, 77, 79, 81, 83 and 85, arranged as shown. The switch unit 9, and relays 29 to 35 are arranged to selectively control the operation of the steering column tilt and extension motors 51 and 53. The switch unit 9 and relays 37 to 43 are arranged to control the seat slide and lift motors 55 and 57, while the switch unit 9 and relays 45, 47 and the seat belt retractor motor 59 are arranged in the form of seat belt winding control means, and relay 49 and solenoid 61 are arranged as the tensionless control means.

The orientation/position control switch unit 11 includes a main switch 87, and memory position switches 89, 91, 93 and 95. In this instance these switches take the form of momentarily open type devices which are connected to the microprocessor via inverters (no numerals).

The memory of the mircroprocessor is divided into 5 banks. The first four of the banks are arranged to to be selectively accessible while the fifth is arranged to act as working memory which is constantly open and to be written when any of the switches of unit 9 are pressed to adjust the instant setting of the steering wheel and seat.

By way of example, when the driver wishes to adjust the seat and steering wheel positions, all that is necessary is to manipulate the switch unit 9. For example, if it is desired to adjust the angle of the steering wheel, the driver can close movable contact 63 with one of stationary contacts 71 to 73. By way of example, assume that contacts 63 and 71 are brought into contact. Under these conditions the mircroprocessor 1 reacts and induces the energization of relay 29 as long as the just mentioned contacts are maintained in contact with one another. This in turn causes current to pass through the tilt motor 51 in a manner which increases the angle of the steering column (by way of example only). On the other hand, if contacts 63 and 73 are brought into contact the reverse situation occurs, whereby relay 31 is energized and motor 51 induced to run in the reverse direction. This of coures induces the angle of the steering column to decrease.

The amount of extension of the steering column, the position of the seat and the height of the same can be similarly adjusted by closing the appropriate contacts for the appropriate length of time.

When all of the variables are adjusted to the drivers liking, manipulation of switch unit 11 enables the instant set of data to be memorized. For example, by setting the main switch 87 on and subsequently pressing switch 89, the instant outputs of the tilt sensor 13, the extension sensor 15, seat slide sensor 17 and the seat lift sensor 19 are stored in the first memory bank of the mircroprocessor 1 as standard counter values.

With the present invention, even if the switch unit 11 is not used, all of the above mentioned values are automatically written into the fifth memory bank of the microprocessor. This section of the memory is the one that is accessed during running of control programs.

By closing switch 91 while the main switch 87 is on, it is possible to transfer the data in bank 5 to any of the other four memory banks in a manner which overwrites any data that have been stored previously therein.

Hence, with the illustrated system it is possible to record four (in this instance) sets of data (in memory sections 1 to 4) and thus allow for four different drivers to record their preferential settings. These settings can be installed in the fifth memory section by pressing the appropriate one of the switches 89, 91, 93 and 95 with the main switch off.

Of course the present invention is not limited to just the above mentioned variables and other settings such as the door or external rear vision mirror settings, the angle of reclination of the seat back and others can be memorized by suitably increasing the number of switches and memory sections available.

It is further possible to provide a switch 119 which enables the driver to return the seat and the steering column from the drivers position to the retracted position or from the retracted position to the driving position currently resident in the fifth memory section. For saftey reasons it is possible to combine this switch with the vehicle speed sensor and ensure that it is not operative until the vehicle speed is detected as being zero. This protects against accidental retraction of the drivers seat while the vehicle is moving. The reason for this setting will become more clearly appreciated hereinlater when a discussion of the control and operation of the instant embodiment is made in conjunction with the flow chart shown in FIG. 3.

Figure 3:
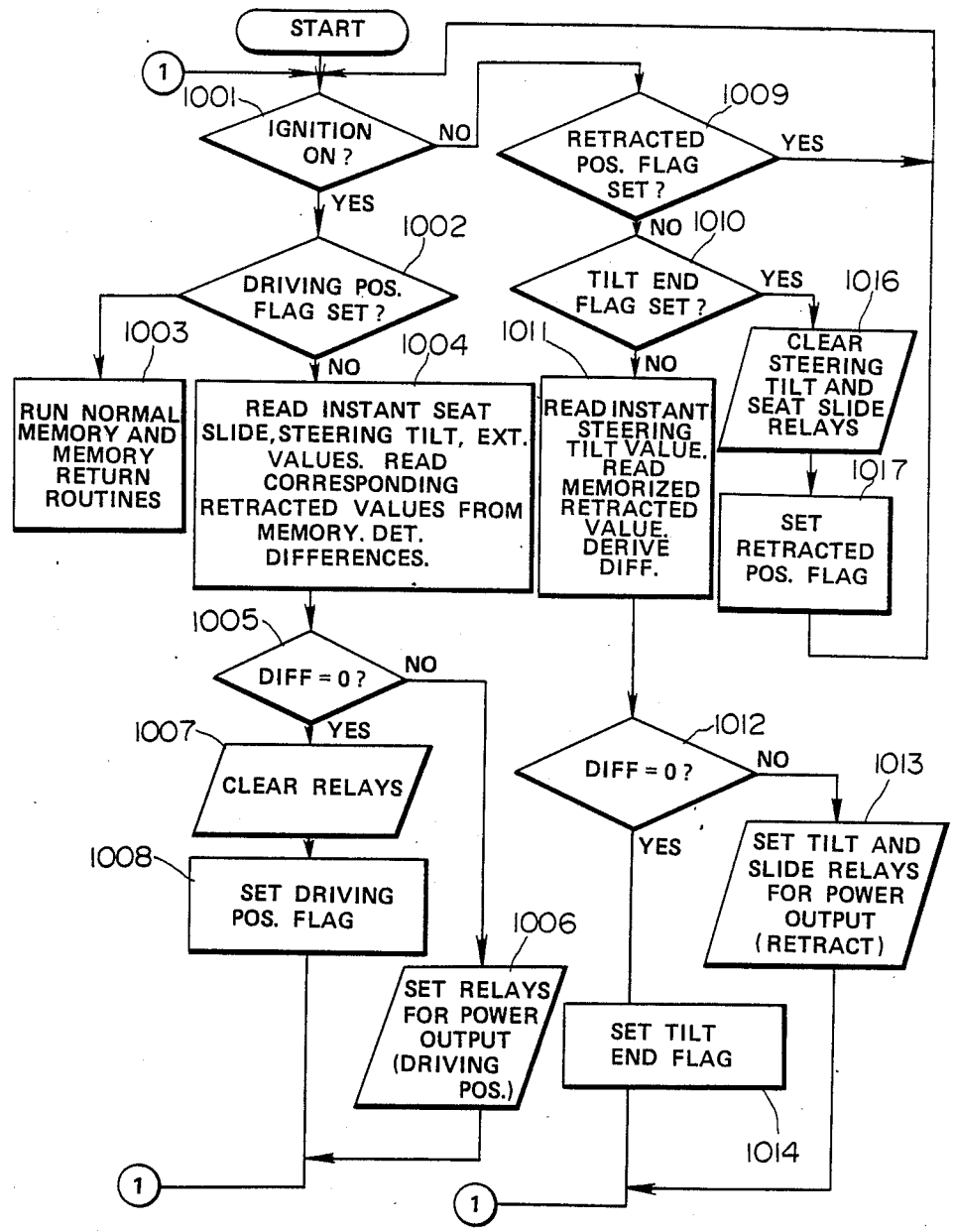
FIG. 3 is a flow chart showing the control steps which characterize the operation of the embodiment of the invention.

The operation of the embodiment will become more clearly appreciated as an explanation of the content of the flow chart shown in FIG. 3 is made hereafter.

FIG. 3 shows a flow chart depicting the control steps which characterize the present invention. As shown the first step of this control routine is to sample the instant condition of the engine ignition switch. If the engine is off it is assumed that the driver has or wishes to alight from the vehicle while if the engine is running it is assumed the driver has entered the vehicle and is about to drive the same. As an alternative to this it is possible to sense the instant status of control switch 119 which is provided to enable the driver to condition the seat and steering wheel as desired. For example, if the driver wishes to momentarily alight from the vehicle without stopping the engine, the provision of this switch enables the seat to be moved rearwardly and kept in such a position irrespective of the condition of the engine.

Assuming that the switch—be it the ignition switch 3 or the control switch 119—is closed the system assumes that the driver requires the steering column and the drivers seat to be set in a preselected driving position. At step 1002 the status of a driving position flag is checked. This flag is set only upon all of the driving position requirements being achieved. If this flag is set then the program flows off to step 1003 wherein routines are run. On the other hand, if the flag has not been set then the program goes to step 1004 wherein outputs of the seat slide sensor 17, wheel tilt sensor 13 and the steering column extension sensor 15 are read. At this step the values resident in the fifth memory section of the microprocessor 1 are also read and the difference between corresponding values derived.

At step 1005 it is determined if any differences exist between the values read in step 1004. In the case that differences still remain the program goes to step 1006 wherein commands to energize the appropriate relays are issued and thus ensure that any element that has not yet reached its required position is continued to be moved theretoward. On the other hand, if the answer is negative indicating that all of the driving positional requirements have been met then the program flows to step 1007 wherein a command is issued to clear all of the servo control relays and thus stop the various movements. At step 1008 a driving position flag is set and the program recycles to step 1001.

As will be appreciated steps 1002 to 1008 are involved with moving the drivers seat and other control elements such as the steering column and the like from retracted positions to a series of prememorized ones.

In the event that step 1001 indicates that the driver wishes to alight from the vehicle then the program flows to step 1009 wherein the status of a retracted position flag is checked. If this flag has not been set it is assumed that, in the instant embodiment, the tilting of the steering column has not yet reached its fully retracted angle. Viz., in order to overcome the problem which plagues the prior art, the instant embodiment moves the driver's seat rearwardly until the tilting action of the column terminates. Upon completion of the tilting, the sliding of the seat is arbitarily stopped irrespective of whether or not it has been moved all the way back or not. Further, in the instant embodiment, retraction of the steering column is not carried out so as to reduce the possiblity that extension control may terminate prior to the termination of the tilting operation and thus re-introduce the possiblity of disconcerting multiple stage termination occuring.

Hence, in accordance with the present embodiment, if the outcome of step 1009 is negative then at step 1010 the status of a tilt end flag is checked. If this flag has not yet been set, it is assumed that the tilting operation is still going on and accordingly at step 1011 the output of the tilt sensor count is read and compared with a prememorized value which denotes the fully tilted position.

In this embodiment the output of the tilt and other sensors are converted into pulses which are used to produce a numerical value or count which is updated and held in RAM. The desired positions are similarly stored in the form of a numerical value or count.

Hence, comparision of the instant and desired values can be simply carried out by subtracting one from the other. In the instant embodiment the derivation of the difference between the instant and desired counts is determined in step 1011.

At step 1012 it is determined if the magnitude of the difference is equal to zero or not. If this enquiry indicates that the difference between the two counts is not zero then the program flows to step 1013 wherein commands which energize the relays which energize both the motors 51 and 55 to move the steering column and the seat toward their most tilted and most rearward positions, are issued. This ensures that while the tilting operation is being conducted it is possible to move the seat.

However, if the outcome of step 1012 is such as to indicate that no difference between the two counts exist then the program goes to step 1014 wherein a tilt end flag is set. Following this the program recycles to step 1001.

As will be appreciated following the setting of the tilt end flag in step 1014, during the next run the program will flow though steps 1009, 1010 and then across to step 1016 wherein commands to clear both of the relays which control the energization of the servo motors 51 and 55 and thus stop the operation of the same. At step 1017 the retracted position flag is set and the program loops back to step 1001.

Upon its running, the program will flow only through step 1009 before returning to the top of the chart.

Of course the present invention is not limited to the above disclosed forward and rearward movement of the seat and control steps which sense changes in height of the seat and/or changes in the angle of reclination of the seat back can also be sensed and taken into account if so desired.

It will be noted that the omission of the seat belt control is within the scope of the present invention and that the invention can be applied to vehicles wherein such means are not provided.

What is claimed is

1. In a method of controlling vehicle equipment the steps of:
memorizing a first seat position wherein ingress and egress from a vehicle is facilitated;
memorizing a second seat position suited to driving in said vehicle;
memorizing a first position for a piece of vehicle equipment which facilitates ingress and egress from said vehicle;
memorizing a second position for said piece of equipment which is suited to driving the vehicle;
moving said piece of equipment from its said second position toward its said first position in response to a first signal, said first signal being indicative of the vehicle in which said vehicle equipment is disposed having assumed a condition suitable for ingress and egress from the vehicle;

moving said seat from said second seat position toward said first seat position in response to said first signal; and terminating the movement of said seat toward said first seat position in response to the piece of equipment reaching its said first position.

2. A method as claimed in claim 1 further comprising the steps of:

moving said seat toward said second seat position in response to a second signal, said second signal being generated by a sensing means which senses the vehicle having assumed a condition suitable for driving;

moving said piece of equipment toward its said second position from its said first position in response to said second signal.

3. A method as claimed in claim 1 further comprising the steps of:

memorizing a plurality of said seat and said equipment second position pairs in a memory;

selecting one of said position pairs;

moving said seat to its said second position of the selected pair in response to a second signal, said second signal being generated by a sensing means which senses the vehicle having assumed a condition suitable for driving; and moving said piece of equipment to its said second position of the selected pair in response to said second signal.

4. A system as claimed in claim 1 further comprising:

means for moving said seat toward said second seat position in response to a second signal, said second signal being generated by a sensing means which senses the vehicle having assumed a condition suitable for driving; and means for moving said piece of equipment toward its said second position for its said first position in response to said second signal.

5. A system as claimed in claim 1 further comprising:

means for memorizing a plurality of said seat and said equipment second position pairs;

means for selecting one of said position pairs;

means for moving said seat to its said second position of the selected pair in response to a second signal, said second signal being generated by a sensing means which senses the vehicle having assumed a condition suitable for driving; and means for moving said piece of equipment to its said second position of the selected pair in response to said second signal.

6. A vehicle equipment control system which comprises:

means for memorizing a first seat position wherein ingress and egress from a vehicle is facilitated;

means for memorizing a second seat position suited to driving in said vehicle;

means for memorizing a first position for a piece of vehicle equipment which facilitates ingress and egress from said vehicle;

means for memorizing a second position for said piece of equipment suited to driving in said vehicle;

means for moving said piece of equipment from its said second position toward its said first position in response to a first signal, said first signal being indicative of the vehicle in which said vehicle equipment is disposed having assumed a condition suitable for ingress and egress from the vehicle;

means responsive to said first signal for moving said seat from said second seat position toward said first seat position; and means for terminating the movement of said seat toward said first seat position in response to the piece of equipment reaching its said first position.

7. In a vehicle comprising:

a seat;

a first servo for selectively moving the seat between a predetermined position wherein ingress and egress from said vehicle is facilitated and a selectable driving position;

a steering wheel, said steering wheel being mounted on a steering column;

a second servo for moving said steering column between a predetermined position wherein ingress and egress from the vehicle is facilitated, and a selectable driving position;

a circuit including a memory, said memory retaining said seat predetermined position, said seat selectable driving position, said steering column predetermined position and said steering column selectable driving position, said circuit being operatively connected with said first and second servos, said circuit including control means for inducing said first servo to move said seat toward its said predetermined position from its said selectable driving position and said second servo to move said steering column to its said predetermined position, said control means terminating the operation of said first and second servos upon said steering column reaching its said predetermined position.

8. A method of controlling vehicle equipment comprising the steps of:

using a first servo to selectively move a seat between a predetermined position wherein ingress and egress from a vehicle is facilitated and a selectable driving position;

using a second servo to move a steering column on which a steering wheel is mounted between a steering column's predetermined position wherein ingress and egress from the vehicle is facilitated and a steering column's selectable driving position;

retaining the predetermined seat and steering column positions and the seat and steering column driving positions in a memory;

inducing said first servo to move said seat toward its said predetermined position from its said first selectable driving position and said second servo to move said steering column to its said predetermined position in response to a first signal, said first signal being indicative of the vehicle in which said vehicle equipment is disposed having assumed a condition suitable for ingress and egress from the vehicle; and terminating the operation of said first and second servos upon said steering column reaching its said predetermined position.

9. A method as claimed in claim 8 further comprising the steps of:

inducing said first servo to move said seat to its said selectable driving position and said second servo to move said steering column from its said predetermined position to its said selectable driving position in response to a second signal, said second signal being generated by a sensing means which senses the vehicle having assumed a condition suitable for driving.

10. A method as claimed in claim 9 further comprising the steps of:
   memorizing a plurality of pairs of first and second selectable driving positions, each pair comprising one seat selectable driving position and one steering column selectable driving position;
   selecting one of said pairs;
   using the selectable driving positions of the selected pair in response to a second signal, said second signal being generated by a sensing means which senses the vehicle having assumed a condition suitable for driving.

11. In a method of controlling vehicle equipment the steps of:
   memorizing an ingress/egress position for a first piece of vehicle equipment, said first equipment's ingress/egress position being selected to facilitate ingress and egress from a vehicle;
   memorizing a driving position for said first piece of equipment, said first equipment's driving position being suited to driving the vehicle;
   memorizing an ingress/egress position for a second piece of vehicle equipment, said second equipment's ingress/egress position being selected to facilitate ingress and egress from said vehicle;
   memorizing a driving position for said second piece of equipment, said second equipment's driving position being suited to driving the vehicle;
   moving said first and second pieces of equipment from their said respective driving positions toward their said respective ingress/egress positions in response to a first signal, said first signal being indicative of the vehicle in which said first piece of vehicle equipment is disposed having assumed a condition suitable for ingress and egress from the vehicle; and
   terminating the movement of said first and second pieces of equipment toward their said respective ingress/egress positions in response to one of said first and second pieces of equipment reaching its respective ingress/egress position.

12. A vehicle equipment control arrangement comprising:
   means for memorizing an ingress/egress position for a first piece of vehicle equipment, said first equipment's ingress/egress position being selected to facilitate ingress and egress from a vehicle;
   means for memorizing a driving position for said first piece of equipment, said first equipment's driving position being suited to driving the vehicle;
   means for memorizing an ingress/egress position for a second piece of vehicle equipment, said second equipment's ingress/egress position being selected to facilitate ingress and egress from said vehicle;
   means for memorizing a driving position for said second piece of equipment, said second equipment's driving position being suited to driving the vehicle;
   means for moving said first and second pieces of equipment from their said respective driving positions toward their said respective ingress/egress positions in response to a first signal, said first signal being indicative of the vehicle in which said first piece of vehicle equipment is disposed having assumed a condition suitable for ingress and egress from the vehicle; and
   means for terminating the movement of said first and second piece of equipment toward their said respective ingress/egress positions in response to one of said first and second pieces of equipment reaching its said respective ingress/egress position.

13. In a method of controlling vehicle equipment the steps of:
   memorizing an ingress/egress seat position wherein ingress and egress from a vehicle is facilitated;
   memorizing a driving seat position suited to driving in said vehicle;
   memorizing an ingress/egress position for a piece of vehicle equipment, said equipment's ingress/egress position being selected to facilitate ingress and egress from said vehicle;
   memorizing a driving position for said piece of equipment, said equipment's driving position being suited to driving the vehicle;
   moving said piece of equipment from its said driving position toward its said ingress/egress position in response to a first signal, said first signal being indicative of the vehicle in which said vehicle equipment is disposed having assumed a condition suitable for ingress and egress from the vehicle;
   moving said seat from said driving seat position toward said seat ingress/egress position in response to said first signal; and
   terminating the movement of said seat and said piece of equipment toward their respective ingress/egress positions in response to one of said seat and said piece of equipment reaching its ingress/egress position.

14. A vehicle equipment control arrangement comprising:
   means for memorizing an ingress/egress seat position wherein ingress and egress from a vehicle is facilitated;
   means for memorizing a driving seat position suited to driving in said vehicle;
   means for memorizing an ingress/egress position for a piece of vehicle equipment, said equipment's ingress/egress position being selected to facilitate ingress and egress from said vehicle;
   means for memorizing a driving position for said piece of equipment, said equipment's driving position being suited to driving the vehicle;
   means for moving said piece of equipment from its said driving position toward its said ingress/egress position in response to a first signal, said first signal being indicative of the vehicle in which said vehicle equipment is disposed having assumed a condition suitable for ingress and egress from the vehicle;
   means for moving said seat from said driving seat position toward said seat ingress/egress position in response to said first signal; and
   means for terminating the movement of said seat and said piece of equipment toward their respective ingress/egress positions in response to one of said seat and said piece of equipment reaching its ingress/egress position.

15. In a method of controlling vehicle equipment which includes a first piece of equipment and a second piece of equipment, each of said first and second pieces of equipment having first and second positions respectively, said first positions facilitating ingress and egress from a vehicle, said second positions being suited to driving the vehicle, the steps comprising:
   moving said first and second pieces of equipment from their respective second positions to their respective first positions; and
   terminating the movement of said first and second pieces of equipment when the first piece of equipment reaches its first position.

* * * * *